Nov. 13, 1945.   H. W. SANFORD   2,388,710
VALVE
Filed Jan. 14, 1941
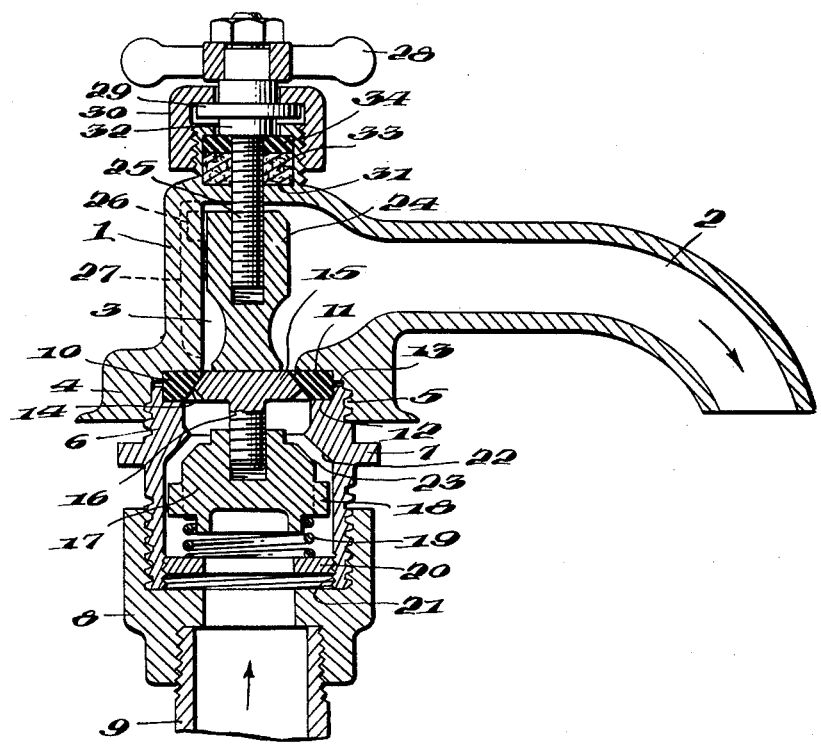
Inventor
Hugh W. Sanford
By Cyrus Kehr & Swecker
his Attorneys Patented Nov. 13, 1945

2,388,710

UNITED STATES PATENT OFFICE 2,388,710

VALVE

Hugh W. Sanford, Knoxville, Tenn.

Application January 14, 1941, Serial No. 374,388

2 Claims. (Cl. 277—27)

This invention relates to an improvement in valves of the character of faucets, globe valves, check-valves, and the like, and relates more particularly to the packing or sealing devices which not only form the valve seats but also seal connected parts of the valve structure against the leakage of fluid.

The object of the invention is to improve the construction and arrangement of such sealing devices and valve seats for obtaining more effective and secure sealing action thereby, in a simple and yet inexpensive manner, particularly by the use of a sealing washer or gasket, which is pinched in place to constitute an effective fluid tight seal when in place between opposed or connected portions of the valve, and which in some instances of position may also constitute a valve seat.

A further object of the invention is to improve the construction of a valve of the faucet type, to simplify the manner of changing the washer thereof when it becomes worn and requires replacement, by constructing the faucet of connected parts so arranged that they may be disconnected for ready access to the washer for replacement when desired. Provision is made also in the faucet for the automatic sealing off of the force of fluid upon the disconnection of the parts of the faucet, to eliminate the necessity and inconvenience of a separate fluid cut-off which has been required heretofore before the parts of the faucet could be disconnected sufficiently to remove and replace the gasket.

A still further object is to prevent rotation of the valve element on its seat during opening and closing movements thereof, as by a non-rising valve stem, thus reducing the wear on the valve and its seat, while preventing injury to the valve seat by excessive pressure due to rotation of the valve stem by too much force.

These objects are accomplished in one form of the invention that is illustrated in the accompanying drawing, which is a vertical sectional view through a faucet, as a preferred embodiment thereof.

The invention is shown in the drawing as applied to a faucet having a main body 1 with a laterally directed spout 2 in communication with a chamber 3 in the body 1.

The lower end portion of the body 1 is provided with a ring 4 formed thereon and internally screw-threaded at 5 to receive therein the upper end of a sleeve 6, which upper end is externally screw-threaded to have a relatively loose screw connection with the threaded portion 5 of the ring 4, capable of being coupled and uncoupled by manual rotation. A flange 7 is formed on the sleeve 6 and preferably squared or hexagon or other shape to facilitate grasping thereof for turning of the sleeve 6 or for holding the same while unscrewing the body 1 therefrom.

The lower end portion of the sleeve 6 is threaded into the upper end of a pipe reducer 8, which in turn, is screw-threaded with a pipe 9 adapted to be connected with a source of fluid under pressure for supplying fluid to the faucet.

Interposed between the adjacent ends of the body 1 and sleeve 6 is a ring 10, forming a gasket, seated in grooves 11 and 12 in said parts 1 and 6 in position to overlap a crack 13 therebetween. When the body 1 is screwed up on the end of the sleeve 6, the ring 10 is pinched therebetween in said overlapping relation with opposite sides of the crack 13 to form an effective seal thereover and to prevent the leakage of fluid through the crack to the threaded connection between the parts 1 and 6, whereby said threaded connection may be relatively loose for manual screwing up and unscrewing thereof. The gasket 10 fits snugly against the side walls surrounding it and the pinching effect is applied so that the radial pressure of the fluid will expand 10 radially so as to seal the outlet crack between the seats 11 and 12. This sealing action is maintained over the crack 13 preventing leakage therethrough until the body 1 is unscrewed from the sleeve 6 by an amount which destroys the lap of the gasket 10 with one or both of the adjacent faces of the seats 11 and 12 in said parts. The sliding relation of the gasket 10 with said faces maintains this seal until it is broken by the substantial separation of the parts. The ring 10 is constructed preferably of yieldable material, such as soft rubber, rubber-like material, cork, or the like, that will yield sufficient for a pinching action between the parts of the faucet, and yet will effectively seal the overlapped edges of the crack 13.

The pinching pressure between the seats 11 and 12 is not relied upon to cause the final sealing, but this pinching pressure merely starts the radial expansion of the gasket 10, so that, whatever the internal pressure may be, the joint 13 will not leak, because the greater the internal pressure, the greater will be the radial expansion of the gasket 10 and the more effectively it will seal the crack B.

The ring 10 serves also as a valve seat, having a conical seating surface 14 at the inner underside thereof to receive a valve body 15 thereagainst. This relation of conical surfaces tends to begin the radial expansion of the gasket 10, and also facilitates keeping the valve seat surface clean, so that pebbles, scales, and other foreign matter do not tend to lodge between the valve body and seat and cause leakage when the valve is seated, and also because the fluid going through the faucet tends to wash out any dirt that might collect on this seat, whereas if the seat was not tapered there would be a tendency for the dirt to collect and cause the valve to leak.

The valve body 15 has a depending pin 16 extending therefrom and screw-threaded into a plunger 17 slidably mounted in the sleeve 6 and capable of adjustment by the screw-threaded connection with the pin 16 toward and from the valve body 15. The periphery of the plunger 17 has radial guide flanges 18 thereon for centering the plunger 17 in the sleeve while allowing freedom of axial movement relative thereto and spacing the plunger from the surrounding wall of the sleeve for free flow of fluid thereby. The plunger is normally pressed in an upward direction by a coiled spring 19 interposed between the lower end of the plunger and a washer 20 screw-threaded into the lower end portion of the sleeve 6 which is threaded at 21 to receive said washer. The force of the fluid acting on the plunger 17 together with the pressure of the spring 19, tend to maintain the valve 15 seated, until the same is forcefully unseated as hereinafter described.

The sleeve 6 is provided with an internal valve seat 22 therein in position to be engaged by a conical valve portion 23 formed on the upper edge of the plunger 17, but the connection between said plunger and the pin 16 is preferably such as will maintain the surfaces 22 and 23 separated, as shown in Fig. 1, when the valve 15 is in its normal seated position. However, when the body 1 is removed from the sleeve for replacement of the ring 10, the valve surface 23 on the plunger 17 engages the seat 22 to seal off the source of fluid under pressure and prevent discharge or leakage thereof, during the replacement of the ring 10. As shown in the drawing, the relation is such that the valve surface 23 engages the seat 22, thus sealing off the fluid under pressure, before the seal is broken around the gasket 10 by the separation of the body 1 and sleeve 6.

The valve 15 is adapted to be unseated by engagement of the upper surface thereof with a nut 24, having screw-threaded connection with a valve stem 25. The nut 24 is elongated and has a lower end shaped to abut against the upper surface of the valve body 15, and it is formed with a radially projecting gib 26 thereon received in a groove 27 in the faucet body 1 to hold the nut 24 against turning movement during the rotation of the valve stem 25.

The upper end portion of the valve stem 25 has secured thereon a handle 28, beneath which is a collar 29 rotatably mounted in a cap piece 30 screw-threaded rigidly on the faucet body 1.

The faucet body 1 has a recess 31 in the upper end thereof surrounding the opening for the valve stem 25, which recess 31 receives in the upper end thereof a hub 32 that supports the collar 29, said collar being journaled on the non-threaded upper end portion of the valve stem 25 and cooperating with the cap piece 30 to form a thrust bearing for the valve stem. The recess 31 is partially filled with fibrous material 33, such as felt under compression, which is surrounded by a gasket 34 that overlaps the adjacent edges of the recess 31 and the hub 32, covering the crack therebetween and forming a check-valve over said crack to prevent the leakage of fluid therethrough. The gasket 34 may be formed of rubber or other suitable material of the character of the ring 10.

Rotation of the valve stem 25 by the handle 28 causes axial movement of the nut 24 to press downward on the valve body 15 against the tension of the spring 19 and the pressure of the fluid in the pipe 9, to unseat the valve body and allow flow of the fluid through the faucet. When the handle 28 is turned in the opposite direction, the pressure of the nut 24 on the valve body 15, is withdrawn, and the pressure of the fluid acting on the plunger 17, alone or with the spring pressure 19, effectively seats the valve 15 and stops the force of the fluid flow through the faucet. The character of the ring or gasket 10, as well as its relation between the coupled parts of the faucet effectively seals the connection therebetween, while allowing these parts 1 and 6 to be uncoupled manually for replacement of the ring 10 when desired. When the faucet body 1 is unscrewed from the sleeve 6, the force of the pressure acting on the plunger 17 will force the latter upward during the unscrewing action and cause its valve surface 23 to engage the seat 22, which are formed preferably with a ground fit effectively sealing off the pressure during the replacement of the packing ring. However, the plunger 17 is moved down to its unseated position by the replacement of the faucet body 1 with the gasket therein.

In this faucet, the rotation of the valve stem in one direction tends merely to move the valve element 15 off its seat in the gasket 10, without rotation, and in the opposite direction, to allow it to engage its seat. There can be no rotation of the handle 28 that will injure the gasket 10 by undue pressure from the valve 15, because the maximum pressure applied thereto is that of the fluid pressure on the lower side of the valve 15, plus the slight additional pressure of the relatively weak spring 19 that holds the valve disc 15 seated against the gasket 10 when there is no opposite pressure.

In faucets used heretofore, the stem, by rising, causes engagement between the valve and the gasket. Since normally the valve disc rotates in engagement with the sealing gasket, if it be squeezed hard enough to prevent leakage, when it is rotated with too great a force, it will distort the gasket and injure it, thus requiring frequent replacement of the gaskets or washers.

In this invention, the non-rising valve stem, the non-rotating valve disc, in operating to move the valve from its seat against the fluid pressure, with no possibility of the pressure on the seat exceeding the maximum pressure of the fluid and the spring, produces a valve action which closes somewhat as a check-valve, and the handle and non-rising stem serve merely to move the valve from its seat.

I claim:

1. In a valve structure, valve body sections having an interengaged rotatable wedging connection with each other capable of separation and detachment and having a radial crack between said sections at which the sections are separated, said sections having aligned shoulders on opposite sides of said crack, an annular gasket of flexible yieldable material interposed and pinched between said body sections overlapping the shoulders at opposite sides of the crack and in position to bear radially against said shoulders and to be pressed thereagainst over the crack by internal fluid pressure in the valve, said gasket having a conical valve seat therein, and a conical valve in position to engage said seat and in position to expand the gasket over the crack and against the shoulders by seating engagement with the gasket.

2. In a valve structure, valve body sections having a screw-threaded connection directly with each other capable of separation and detachment and having a radial crack between said sections at which the sections are separated by relative unscrewing, said sections having aligned shoulders on opposite sides of said crack, an annular gasket of flexible yieldable material interposed and pinched between said body sections overlapping the shoulders at opposite sides of the crack and in position to bear radially against said shoulders and to be pressed thereagainst over the crack by internal fluid pressure in the valve, said gasket having a conical valve seat therein, and a conical valve in position to engage said seat and in position to expand the gasket over the crack and against the shoulders by seating engagement with the gasket, means connected with said valve body sections and forming a second valve seat, and a second valve in position to engage said second valve seat and arranged to seat in the same direction as the first-mentioned valve, said second-mentioned valve being constructed to be seated in pressure-holding relation upon removal of the pressure-holding relation of the first-mentioned valve during replacement of the gasket.

HUGH W. SANFORD.